United States Patent [19]

Ohkoshi et al.

[11] Patent Number: 5,124,089
[45] Date of Patent: Jun. 23, 1992

[54] METHOD OF PRODUCING TRANSMISSIVE SCREENS

[75] Inventors: Akio Ohkoshi; Takuji Inoue, both of Tokyo; Toyohiro Ogino; Toshikazu Yokota, both of Joetsu, all of Japan

[73] Assignee: Sony Corporation, Tokyo, Japan

[21] Appl. No.: 465,188

[22] PCT Filed: Jun. 22, 1988

[86] PCT No.: PCT/JP88/00617
§ 371 Date: Feb. 22, 1990
§ 102(e) Date: Feb. 22, 1990

[51] Int. Cl.$^5$ .............................................. B27D 11/00
[52] U.S. Cl. ...................................... 264/1.4; 264/1.6; 264/1.7; 264/2.2; 264/102; 264/160; 264/334
[58] Field of Search .................... 264/1.4, 1.6, 1.7, 22, 264/102, 160, 334; 350/123, 128

[56] References Cited

U.S. PATENT DOCUMENTS

| | | | |
|---|---|---|---|
| 4,294,782 | 10/1981 | Froehlig | 264/1.4 |
| 4,415,509 | 11/1983 | Toyooka et al. | 264/1.6 |
| 4,512,631 | 4/1985 | Van Breenen | 350/123 |

FOREIGN PATENT DOCUMENTS

| | | | |
|---|---|---|---|
| 3505055 | 8/1986 | Fed. Rep. of Germany | 264/1.6 |
| 49-100131 | 9/1974 | Japan . | |
| 56-121666 | 9/1981 | Japan . | |
| 148525 | 11/1981 | Japan | 264/1.6 |
| 157319 | 12/1981 | Japan | 264/1.6 |
| 159127 | 12/1981 | Japan | 264/1.6 |
| 29629 | 2/1983 | Japan | 264/1.4 |
| 59-225773 | 12/1984 | Japan . | |
| 167506 | 7/1986 | Japan | 264/1.4 |
| 61-177215 | 8/1986 | Japan . | |
| 248707 | 11/1986 | Japan | 264/1.4 |
| 62-90634 | 4/1987 | Japan . | |
| 62-160173 | 7/1987 | Japan . | |
| 14341 | 1/1988 | Japan | 264/1.4 |
| 134227 | 6/1988 | Japan | 264/1.4 |

*Primary Examiner*—James Lowe
*Attorney, Agent, or Firm*—Hill, Van Santen, Steadman & Simpson

[57] ABSTRACT

A transmissive screen for use in a video projector or the like and a manufacturing method thereof is provided wherein a UV-curable resin is coated on a back film or a mold. One surface of a lens surface of opposite shape is formed by the mold. The UV-curable resin is sandwiched between the back film and the mold, ultraviolet rays are irradiated on the UV-curable resin and the screen is released from the mold, thereby forming a transmissive screen in which the lens surface is formed on one surface by the UV-curable resin and the back film is formed on the other surface. Thus, the screen can be reduced in weight and thickness, and can be mass-produced.

7 Claims, 3 Drawing Sheets

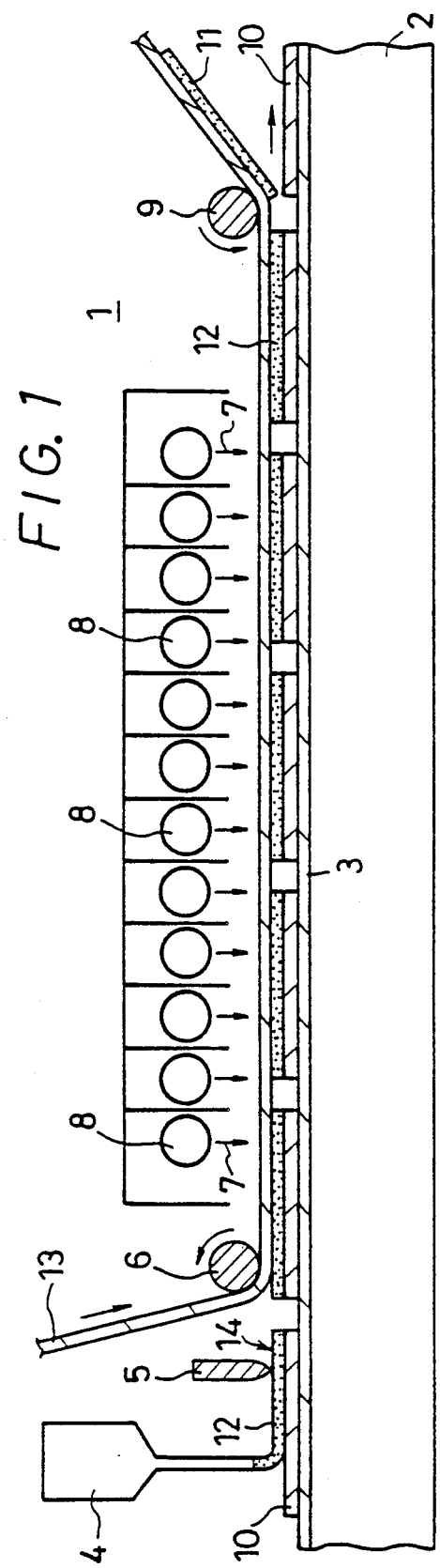
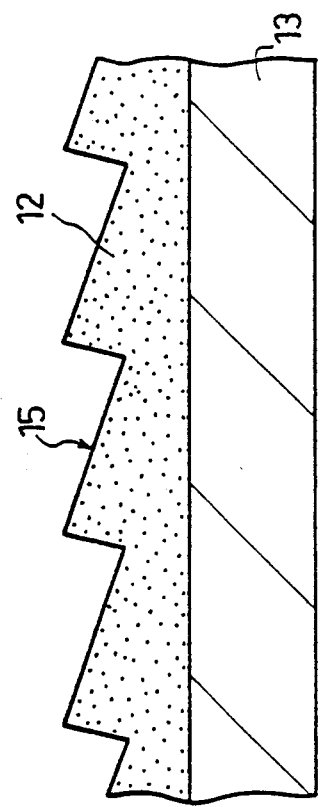
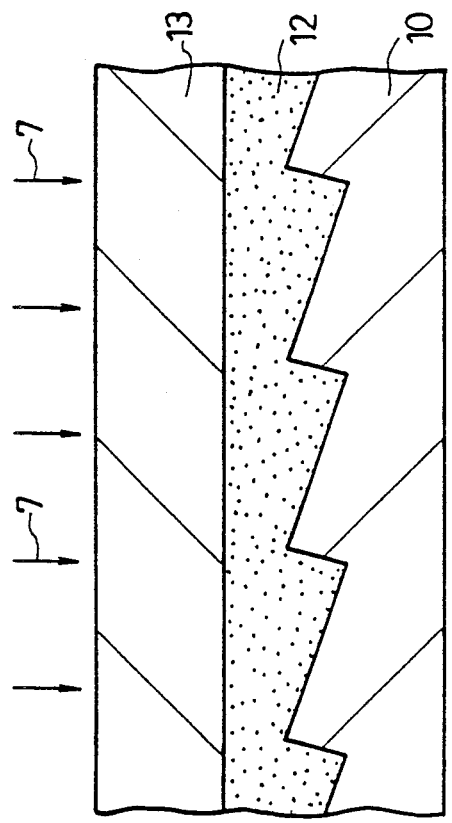

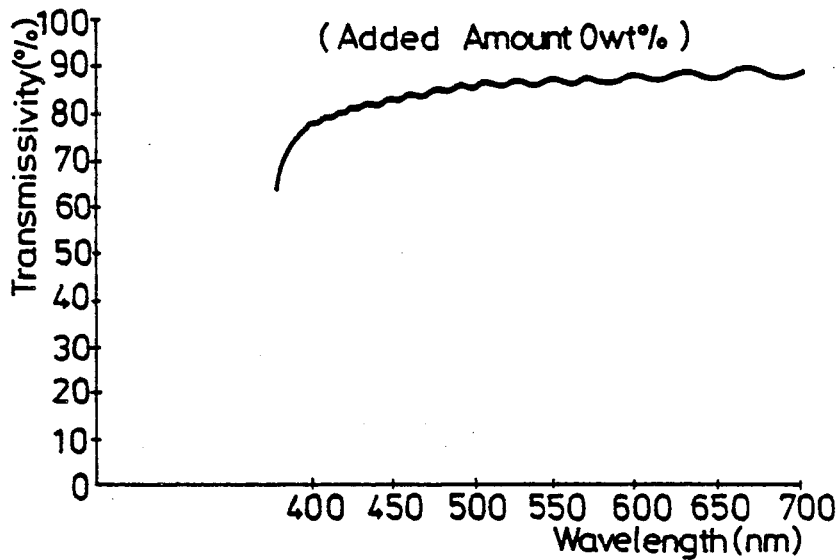
FIG. 4 (Added Amount 0wt%)
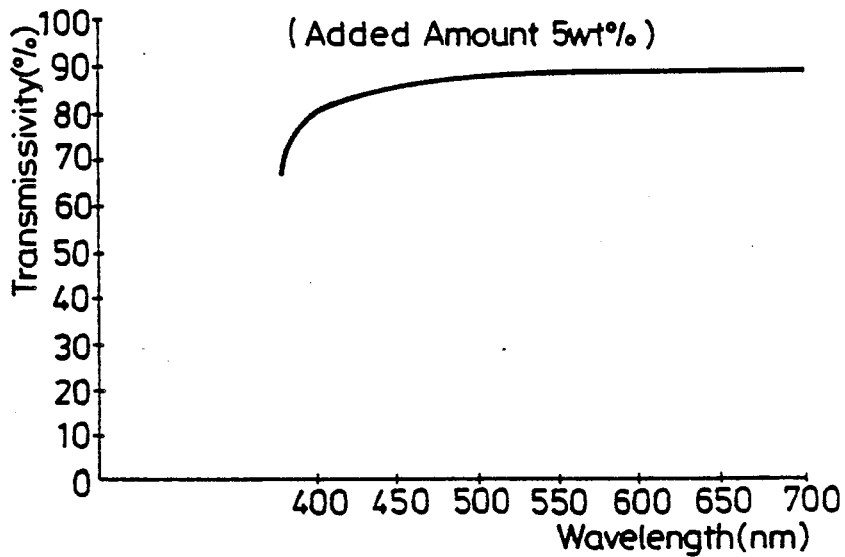
FIG. 5 (Added Amount 5wt%)
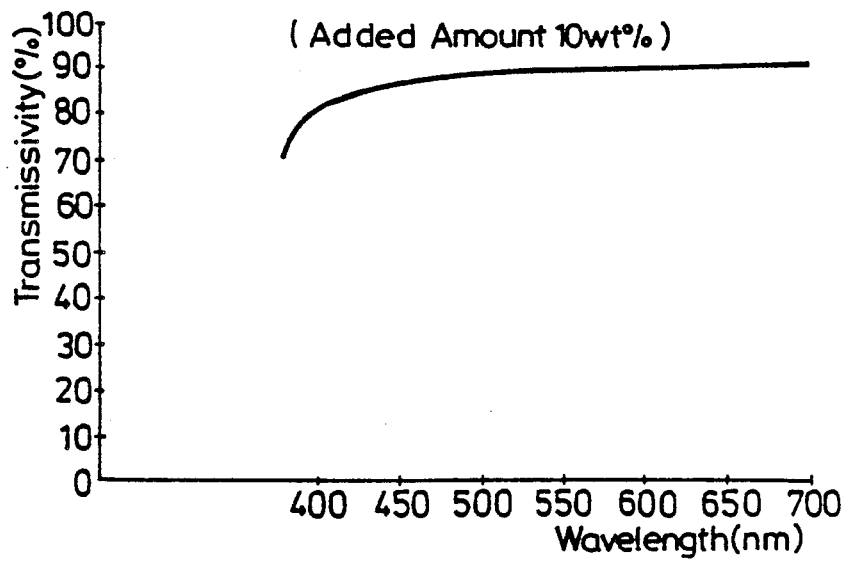
FIG. 6 (Added Amount 10wt%)

METHOD OF PRODUCING TRANSMISSIVE SCREENS

The present invention relates to a transmissive screen for use in a video projector, and a manufacturing method thereof.

A transmissive screen for use in a video projector is generally composed of a Fresnel lens and a lenticular lens, and contains a diffusing agent made, for example, of $SiO_2$ in order to have a diffusing property. The Fresnel lens has a function in which a diverged light from a projection lens is refracted toward a viewer. This Fresnel lens has a lens surface formed on one side of a methacrylic resin plate in which a number of concentric V letter-shaped grooves are formed. A non-lens surface is formed on the other side of the methacrylic resin plate. In general, a hot-press molding method is employed to produce a Fresnel lens screen. According to the hot-press molding method, a methacrylic resin plate of 3 to 5 mm thick is sandwiched between a metal mold in which V letter-shaped grooves opposite to the configuration of the Fresnel lens are concentrically engraved on a copper plate of 1 to 3 mm thick. A calendered metal plate is also provided. The assemble is heated and molded with a pressure. Thus the Fresnel lens screen is produced. A lenticular lens screen is produced similarly.

According to the aforementioned prior-art manufacturing method, in order to form one surface of a Fresnel lens, one surface of the engraved metal mold is needed, and many metal molds are required to mass-produce a Fresnel lens. The metal mold costs 1,500,000 to 2,500,000 yen per one plane, and is expensive. Further, the metal mold needs a large number of planes, and the a metal mold cost increases a cost of the product. A life span of the metal mold provides a press-process of about 800 to 1000 times, which means a metal mold cost of 1,500 to 2,500 yen per plane. In the molding-process, a methacrylic resin plate provided as material must be heated, softened and placed in a condition that it can be molded. A molding temperature must be selected to be high in a range of from 140° to 170° C., and a molding time needs 1.5 to 2 hours per plane. Further, the Fresnel lens screen molded by the hot-press molding method must be released from the metal mold at a high temperature of 80° to 100° C., otherwise it can not be released from the mold without difficulty. If the molded Fresnel lens screen is not uniformly released from the mold, this causes a failure product. Furthermore, the metal mold is heated a very high temperature so that the life span of the metal mold is short, which causes a cost of a product to be increased much more. In addition, the prior-art Fresnel lens screen is thick, which causes a problem of the occurrence of multiple images.

SUMMARY OF THE INVENTION

The present invention is to provide a transmissive screen and a manufacturing method thereof in which the above-described problems can be solved.

A method for manufacturing a transmissive screen according to the present invention comprises the processes of coating a UV-curable resin 12 on one side surface of a back film 13 or a mold 10 in which a lens surface of opposite shape is formed, irradiating ultraviolet rays 7 on the UV-curable resin 12 between the back film 13 and the mold 10, and releasing a molded transmissive screen 11 from the mold 10. A light source 8 for irradiating the ultraviolet rays 7 may be a metal halide lamp, a high pressure mercury lamp, an Xe lamp or the like.

According to the above-mentioned processes, the transmissive screen 11 of this invention can be obtained.

Further, the transmissive screen 11 according to this invention is comprised of the lens made of the UV-curable resin 12 which has a lens surface 15 formed on its one surface and the back film 13 deposited on the other surface of this lens.

The present invention provides a transmissive projector having the above-described transmissive screen 11.

According to the present invention, the UV-curable resin is utilized as a host material of the screen, whereby a molding time can be reduced and a continuous mass-production is made possible. Therefore, a press apparatus, a heating apparatus or the like, needed by the prior-art hot-press system, are not required, which can considerably reduce the cost of the manufacturing facilities. Further, the thickness of the screen can be adjusted to be a desired one so that the transmissive screen can be reduced in weight and thickness.

As described above, in the transmissive screen according to the present invention, the thickness of the screen can be reduced, thereby removing the occurrence of multiple images.

BRIEF DESCRIPTION OF THE DRAWINGS

FIG. 1 is a diagrammatic view of a section of a manufacturing apparatus according to the present invention, FIG. 2 is a diagrammatic view of a section of an example of a manufacturing method according to the present invention, FIG. 3 is a diagrammatic view of a section of a screen according to the present invention, FIGS. 4 to 6 are graphs graphing spectral transmissivity characteristics of a UV-curable resin.

DESCRIPTION OF THE PREFERRED EMBODIMENTS

Figure 7:
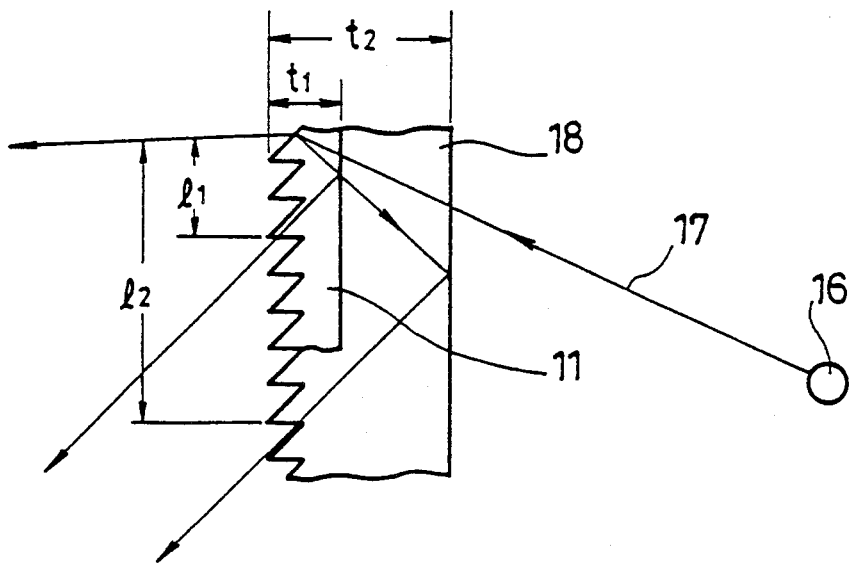
FIG. 7 is a schematic diagram used to explain multiple images.

An embodiment of the present invention will be described with reference to the drawings.

FIG. 1 shows a continuous manufacturing apparatus 1 for continuously producing a Fresnel lens screen. This apparatus 1 is comprised of a base table 2, a conveyor 3 provided on the base table 2, a resin feeder 4, a doctor blade 5, a pressure roll 6, a metal halide lamp 8 for irradiating the ultraviolet rays 7 and a mold-releasing roll 9. Reference numeral 10 designates a resin mold on which there is formed a lens surface of opposite shape to that of a Fresnel lens to be formed. The resin molds are located on the conveyor 3 with a predetermined spacing. A number of resin molds 10 are manufactured on the basis of a master metal mold whose one plane is formed by a cut and mold process so that the manufacturing cost of the resin mold 10 can be reduced. The resin mold 10 can be replaced with a metal mold. In that case, the metal mold is never heated at a high temperature, unlike the prior-art manufacturing method utilizing the hot-press process so that the life span of the metal mold can be extended, which can decrease the cost of the product.

With the employment of this apparatus 1, the Fresnel lens screen 11 is produced according to the following process.

Initially, a UV-curable resin 12 (for example, APR resin (trade name, manufactured by Asahi Chemical Industry Co., Ltd.)), or a GRANDICK resin (trade name, manufactured by Dainippon Ink & Chemicals Inc. etc.) in the melted condition is supplied from the resin feeder 4 to the resin molds 10 which are being conveyed by the conveyor 3. The thicknesses of the coating are made uniform by the doctor blade 5. The coating thickness of the resin 12 must be properly selected in a range of from 0.10 to 2.50 mm. When the coating thickness is small, the uniformity of the thickness becomes inferior. However, when the coating thickness is large, a necessary irradiation time of the ultraviolet rays 7 is extended. In the coating-process, air bubbles must be carefully prevented from entering the resin 12 so that a pin-hole can be prevented from being produced in the screen. For this countermeasure, upon use, after a viscosity of the UV-curable resin 12 is adjusted to be low in a range of from 500 cps to 2000 cps, a vacuum defoaming is performed prior to the coating-process to remove the bubbles contained in the resin 12, and the resin is then utilized. In the next process, a back film 13 (for example, a polyester film, acetate film or the like) of a 50 to 300 μm thickness, transported from above is transported through the pressure roll 6 and is deposited on a coating surface 14 of the resin 12. The back film 13 is deposited on the coating surface of the resin in order to isolate the resin 12 from the air (in particular, oxygen).

As shown in FIG. 1 and FIG. 2 in an enlarged scale, the resin 12 with the back film 13 deposited thereon is transported under the metal halide lamp 8 provided as the ultraviolet ray light source, wherein ultraviolet rays 7 are irradiated on the resin at an intensity of 2 mW/cm$^2$ on the irradiated surface, and under the condition an of irradiation time of 5 minutes, to thereby cure the resin 12. At the completion of the curing-treatment utilizing the ultraviolet rays 7, a Fresnel lens screen 11 is released from the resin mold 10 by the mold-releasing roll 9. Thereafter, the back film 13 is cut and divided so that the Fresnel lens screen 11 shown in FIG. 3 is obtained. Reference numeral 15 denotes a Fresnel lens surface.

While the method in which the back film 13 is deposited on the resin after the resin 12 is coated on the resin mold 10 is described in the above-mentioned embodiment, the Fresnel lens screen 11 can be produced by a method in which after the resin 12 of a desired thickness is coated on the back film 13, the resultant product is laid on the resin mold 10 and is irradiated with the ultraviolet rays 7. While the resin mold is employed as the mold for the lens in the above-described embodiment, the metal mold may be utilized as mentioned hereinbefore. In that case, a machined metal mold and a cast metal mold may be utilized as the metal mold. Except for the metal mold, it is possible to utilize a mold made of ceramics, a mold made of glass, and a gypsum mold. The present invention can be similarily applied to a method of manufacturing a lenticular lens.

An embodiment in which inflammability of the transmissive screen of the present invention is improved will be described next. Generally, a video projector screen is specified to have inflammability of a UL-94HB level. For this reason, according to the present invention, a fire retardant is added to the UV-curable resin 12 with a ratio of 5 to 20 wt% relative to the resin 12, thereby increasing inflammability. As a fire retardant commercially available on the market, there are known, for example, CR-720, CR-509, CLD (trade names, manufactured by Daihachi Kagaku Kogyosho Kabusiki Kaisha), FIRE GUARD (trade name, manufactured by Teijin Kasei Kabushiki Kaisha), FIRE-ROAD A (trade name, manufactured by Osaka Yuki Kagaku Kogyo Kabushiki Kaisha), UNFLAME (trade name, manufactured by Nippon Oils & Fats Co., Ltd.), Kopica (trade name, manufactured by Nippon Yupica Kabushiki Kaisha), et ceterra.

The CR-509 (trade name) was utilized as the fire retardant, was added into the UV-curable resin 12 while varying an addition ratio, and was stirred and mixed thereinto so as to be dispersed uniformly. Thereafter, a test-piece of 0.4 mm thick, 12.7 mm wide and 125 mm long was produced and a burning test was carried out. The test results are represented on the following table. According to the standard of UL-94HB-2.2.B, in case of a test-piece of less than 0.120-inch (3.05 mm) thick, it is specified that a burning velocity thereof should not exceed a burning velocity of 3.0-inch per minute (i.e., 76.2 mm per minute). The test results demonstrate that the above condition can be satisfied by adding a fire retardant of more than 5 wt% to the UV-curable resin 12. In practice, it is preferable that a fire retardant of from 10 to 20 wt% should be added to the resin from a safety standpoint.

TABLE

| Containing amount of fire retardant (wt %) | Burning time of 3-inch | Burning Velocity (mm/minute) | Appearance | Curing time |
|---|---|---|---|---|
| 0 | 57 seconds | 80.2 | — | — |
| 5 | 1 minute and 27 seconds | 52.6 | not changed | not changed |
| 10 | 2 minutes and 36 seconds | 29.6 | not changed | not changed |
| 20 | extinguished halfway | — | not changed | not changed |

As shown on the table, regardless of the addition of the fire retardant into the resin 12, the curing time is not changed, and the screen can be produced under exactly the same exposing condition as that of the case where the fire retardant is not added to the resin. Then, with respect to the samples made of the resin 12 in which the fire retardant is added as in the above-mentioned embodiment, the change of transmissivity was measured while the added amount of the fire retardant was being varied. The measured results are represented in FIGS. 4 to 6. FIG. 4 shows measured results in which the added amount of the fire retardant is zero, FIG. 5 shows measured results in which the added amount of the fire retardant is 5 wt%, and FIG. 6 shows measured results in which the added amount of the fire retardant is 10 wt%, respectively. From these graphs, it is to be noted that, even when the fire retardant is added to the resin (FIGS. 5 and 6), the spectral transmissive characteristics of UV-curable resins are not substantially changed as compared with the case where the fire retardant is not added to the resin (FIG. 4). Therefore, even when the screen is produced under the condition that the fire retardant is added to the resin, a coloring and a physical change are not found in the resultant screen. Although the thickness of the screen must be increased so as to comform to the UL-94HB standard according to the prior-art screen, the thickness of the screen can be decreased according to the present invention without causing any problem from an inflammability standpoint. Simultaneously, it becomes possible to solve a problem of multiple images occurring due to the reflection on the lens surface because the screen has a large thickness. More specifically, as shown in FIG. 7, in order to obtain the same inflammability level, a thickness $t_2$ of a prior-art screen 18 in which the fire retardant is not added must be increased. In the screen 11 of the instant invention, its thickness $t_1$ can be reduced. Therefore, in the case of the present screen 11, a distance $l_1$ in which a real image and a ghost can not be identified from each other can be reduced as compared with a distance $l_2$ of the example of the prior art, thereby the degree of multiple imaging is reduced. In the same figure, reference numeral 16 designates a light source and 17 a light.

Figure 8:
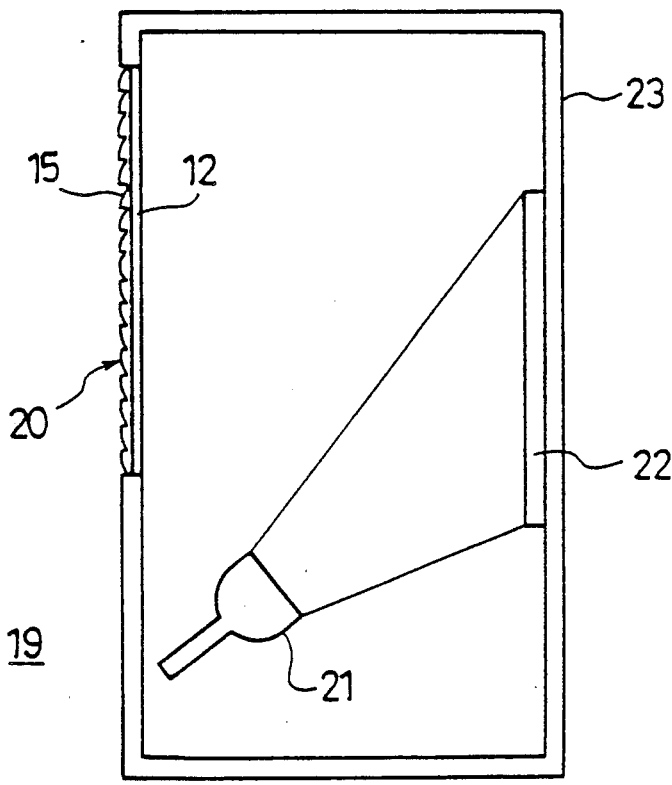
FIG. 8 is a schematic diagram showing an example of a transmissive projector according to the present invention.

FIG. 8 shows a transmissive projector of the present invention utilizing the aforementioned transmissive screen. In FIG. 8, it will be seen that a transmissive projector 19 is comprised of a transmissive screen 20, red, green and blue cathode ray tubes 21 (only one cathode ray tube is shown in the figure) each provided as a video source, a mirror 22 for reflecting visual image lights from the cathode ray tubes 21 on the transmissive screen and a cabinet 23 for accommodating these elements therein. The transmissive screen 20 is formed in exactly the same way as that of FIG. 3, its lens surface 15 facing a viewer and the back film 13 is being opposed to the inside of the cabinet 23.

According to the prior-art transmissive screen manufacturing method, there are then the problems that in the case of a Fresnel lens screen, for example, of 40 to 45-inches, it is thick (3 to 5 mm) and heavy (1.5 to 2 kg). According to the manufacturing method of the present invention, it is possible to obtain a screen of 0.6 to 2 mm thick and which weighs 200 to 300 g. Therefore, as compared with the prior art, the screen of this invention can be reduced in thickness and in weight by about 1/5. As set forth above, in the transmissive screen according to the present invention, the thickness of the screen can be reduced so that it is possible to solve a problem of multiple images occurred due to the reflection on the lens surface when the lens is a Fresnel lens of short focal length. Further, since the screen can be made very thin, it is possible to obtain a rewind-type transmissive screen. According to the manufacturing method of the present invention, a manufacturing time can be considerably reduced as compared with that of the example of the prior art so that the manufacturing method of the invention can be best suited to the mass-production. Furthermore, it is possible to provide an unmanned automated line on the basis of the present invention.

Although various minor changes and modifications might be proposed by those skilled in the art, it will be understood that we wish to include within the claims of the patent warranted hereon all such changes and modifications as reasonably come within our contribution to the art.

We claim:

1. A method for producing transmissive screens, comprising the steps of:
    providing a UV curable resin;
    providing a movable conveyor;
    providing a plurality of molds for imparting a desired lens shape, and placing the plurality of molds at spaced intervals on the conveyor;
    providing a plurality of individual UV light sources arranged in a row along and above the conveyor;
    providing a feed system for a backing film;
    heating the UV curable resin and directing it to flow onto the molds as they move on the conveyor;
    smoothing the UV curable resin for a uniform layer thickness after it has flowed onto each mold;
    applying the backing film onto a first surface of said smoothened UV curable resin which is opposite a second surface formed in the desired lens shape by the mold;
    moving with the conveyor the combination of the backing film, the individual resin molds, and the UV curable resin in the molds along the beneath the row of UV light sources so that each of said molds containing said UV curable resin are continuously subjected to UV radiation for curing the UV curable resin along he light source row;
    after the molds exit from beneath the row of UV light sources, bending the backing film away from the mold so as to release attached molded and cured resin layers with the lens shaped from the individual molds; and
    dividing the backing film between the molded resin layers so that separate transmissive screens are provided.

2. A method for producing transmissive screens, comprising the steps of:
    providing a UV curable resin;
    providing a movable conveyor;
    providing a plurality of molds for imparting a desired lens shape, and placing the plurality of molds at spaced intervals on the conveyor;
    providing a plurality of individual UV light sources arranged in a row along and above the conveyor;
    providing a feed system for a backing film;
    heating the UV curable resin and directing it to flow onto the molds as they move on the conveyor;
    smoothing the UV curable resin for a uniform layer thickness after it has flowed onto each mold;
    applying the backing film onto a first surface of said smoothened UV curable resin which is opposite a second surface formed in the desired lens shape by the mold;
    moving with the conveyor the combination of the backing film, the individual resin molds, and the UV curable resin in the molds along and beneath the row of UV light sources so that each of said molds containing said UV curable resin are continuously subjected to UV radiation for curing the UV curable resin along the light source row;
    after the molds exit from beneath the row of UV light sources, bending the backing film away from the mold so as to release attached molded and cured resin layers with the lens shaped from the individual molds;
    dividing the backing film between the molded resin layers so that transmissive screens are provided; and
    providing the UV light sources such that rays having a power of substantially 2 mw/cm$^2$ are provided.

3. A method according to claim 2 wherein the curing time in which the mold passes from a beginning of said row of light sources to the exit of said row of light sources is substantially five minutes.

4. A method for producing transmissive screens, comprising the steps of:
    providing a UV curable resin;

providing a movable conveyor;
providing a plurality of molds for imparting a desired lens shape, and placing the plurality of molds at spaced intervals on the conveyor;
providing a plurality of individual UV light sources arranged in a row along and above the conveyor;
providing a feed system for a backing film;
heating the UV curable resin and directing it to flow onto the molds as they move on the conveyor;
smoothing the UV curable resin for a uniform layer thickness after it has flowed onto each mold;
applying the backing film onto a first surface of said smoothened UV curable resin which is opposite a second surface formed in the desired lens shape by the mold;
moving with the conveyor the combination of the backing film, the individual resin molds, and the UV curable resin in the molds along and beneath the row of UV light sources so that each of said molds containing said UV curable resin are continuously subjected to UV radiation for curing the UV curable resin along the light source row;
after the molds exit from beneath the row of UV light sources, bending he backing film away from the mold so as to release attached molded and cured resin layers with the lens shaped from the individual molds;
dividing the backing film between the molded resin layers so that separate transmissive screens are provided; and
adjusting the conveyor and providing the length of the row of UV light sources such that a curing time of substantially five minutes results for the UV curable resin in each mold.

5. A method for producing transmissive screens, comprising the steps of:
providing a UV curable resin;
providing a movable conveyor;
providing a plurality of molds for imparting a desired lens shape, and placing the plurality of molds at spaced intervals on the conveyor;
providing a plurality of individual light UV sources arranged in a row along and above the conveyor;
providing a feed system for a backing film;
prior to applying a free flowing UV curable resin into the molds, preventing air bubbles from entering the resin by adjusting a viscosity of the UV curable resin to be in a range from 5 cps to 2000 cps;
heating the UV curable resin and directing it to flow onto they move on the conveyor;
smoothing the UV curable resin for a uniform layer thickness after it has flowed onto each mold;
applying the backing film onto a first surface of said smoothened UV curable resin which is opposite a second surface formed in the desired lens shape by the mold;
moving with the conveyor the combination of the backing film, the individual resin molds, and the UV curable resin in the molds along and beneath the row of UV light sources so that each of said molds containing said UV curable resin are continuously subjected to UV radiation for curing the UV curable resin along the light source row;
after the molds exit from beneath the row of UV light sources, bending the backing film away from the mold so as to release attached molded and cured resin layers with the lens shaped from the individual molds; and
dividing the backing film between the molded resin layers so that separate transmissive screens are provided.

6. A method according to claim 5 wherein a vacuum defoaming is performed prior to placing the flowable resin in the individual molds so as to remove bubbles contained in the resin.

7. A method for producing transmissive screens, comprising the steps of:
providing a UV curable resin;
providing a movable conveyor;
providing a plurality of molds for imparting a desired lens shape, and placing the plurality of molds at spaced intervals on the conveyor;
providing a plurality of individual UV light sources arranged along and above the conveyor;
providing a feed system for a backing film;
heating the UV curable resin and directing it to flow onto the molds as they move on the conveyor;
smoothing the UV curable resin for a smooth top surface after it has flowed onto each mold;
applying the backing film onto a first surface of said smoothened UV curable resin which is opposite a second surface formed in the desired lens shape by the mold;
moving with the conveyor the combination of the backing film, the individual resin molds, and the UV curable resin in the molds along and beneath the plurality of UV light sources so that each of said molds containing said UV curable resin are continuously subjected to UV radiation for curing the UV curable resin along the plurality of light sources;
after the molds exit from beneath the row of UV light sources, bending the backing film away from the mold so as to release attached molded and cured resin layers with the lens shaped from the individual molds; and
dividing the backing film between the molded resin layers.

* * * * *

UNITED STATES PATENT AND TRADEMARK OFFICE
CERTIFICATE OF CORRECTION

PATENT NO. : 5,124,089
DATED : June 23, 1992
INVENTOR(S) : Akio Ohkoshi et al

It is certified that error appears in the above-identified patent and that said Letters Patent is hereby corrected as shown below:

On the Title page of the Patent, after "Assignee:" Please add --Arisawa Mfg. Co., Ltd., Niigata, Japan--.

Signed and Sealed this

Fifth Day of December, 2000

Attest:

Q. TODD DICKINSON

*Attesting Officer*    *Director of Patents and Trademarks*